(12) United States Patent
Luigi

(10) Patent No.: US 6,824,368 B2
(45) Date of Patent: Nov. 30, 2004

(54) PUMP FOR CONVEYING MOLTEN MASSES OF POLYMERS AND ELASTOMERS

(75) Inventor: Macchi Luigi, Gorla Maggiore (IT)

(73) Assignee: Alfatech S.r.l., Varese (IT)

( * ) Notice: Subject to any disclaimer, the term of this patent is extended or adjusted under 35 U.S.C. 154(b) by 0 days.

(21) Appl. No.: 10/349,382

(22) Filed: Jan. 21, 2003

(65) Prior Publication Data

US 2003/0152474 A1 Aug. 14, 2003

(30) Foreign Application Priority Data

Feb. 12, 2002 (IT) .................................... MI2002A0263

(51) Int. Cl.$^7$ ............................ F04C 2/18; F04C 15/00
(52) U.S. Cl. ...................... 418/83; 418/102; 418/206.3
(58) Field of Search ............................ 418/83, 94, 97, 418/102, 206.1, 206.3, 206.4, 206.5, 206.7

(56) References Cited

U.S. PATENT DOCUMENTS

| | | | | |
|---|---|---|---|---|
| 2,531,726 A | * | 11/1950 | Durdin, III | 418/206.4 |
| 3,077,839 A | * | 2/1963 | Gondek | 418/206.1 |
| 3,553,777 A | * | 1/1971 | Fritsch | 418/83 |
| 4,329,128 A | | 5/1982 | Forgues | 418/83 |
| 4,343,602 A | | 8/1982 | Meywald et al. | 418/77 |
| 4,420,291 A | * | 12/1983 | Winstead | 418/83 |
| 5,040,949 A | * | 8/1991 | Crinquette et al. | 418/83 |
| 5,267,847 A | | 12/1993 | Bohm et al. | 425/145 |
| 5,462,420 A | * | 10/1995 | Stehr et al. | 418/83 |
| 5,788,473 A | * | 8/1998 | Buse et al. | 418/206.1 |
| 5,924,854 A | * | 7/1999 | Blume et al. | 418/206.3 |
| 6,213,745 B1 | | 4/2001 | Woodcock et al. | 418/206.7 |
| 2002/0037231 A1 | * | 3/2002 | Saiz | 418/206.5 |

FOREIGN PATENT DOCUMENTS

| | | | | |
|---|---|---|---|---|
| DE | 2200048 | * | 7/1973 | 418/206 |
| FR | 1.367.625 | * | 6/1964 | 418/102 |
| GB | 103669 | * | 1/1917 | 418/206 |
| JP | 5-52185 | * | 3/1993 | 418/102 |
| NL | 73753 | * | 12/1953 | 418/102 |
| RU | 1370305 | * | 1/1988 | 418/102 |

* cited by examiner

Primary Examiner—John J. Vrablik
(74) Attorney, Agent, or Firm—Sheridan Ross PC

(57) ABSTRACT

A pump for conveying molten masses of polymers and/or elastomers comprising a pump body in which are formed an inlet duct for entry of the material, an outlet duct for discharge of the material and a central body communicating with the inlet and outlet ducts and destined to house at least one gear mounted on a motorized shaft for conveying the material from the inlet duct toward the outlet duct. The pump body consists of two parts that can be assembled together, each part of the pump body comprising at least one through hole communicating with the central chamber, so that said at least one shaft of the gear is rotatably supported directly in the pair of opposite facing holes of the two parts of the pump body.

3 Claims, 5 Drawing Sheets

PUMP FOR CONVEYING MOLTEN MASSES OF POLYMERS AND ELASTOMERS

DESCRIPTION

The present invention refers to a gear pump designed to be positioned upstream of an extrusion head to convey molten masses of polymers and or elastomers and in particular highly degradable plastic materials, such as PVC and the like.

Said pumps serve to compensate for the unevenness of flow and of the vibrations caused on the material by the extrusion screw of an extruder, so as to have a constant flow of molten material coming from the pump, to obtain a high quality finished product that complies with strict tolerances.

Pumps for non-degradable extruded plastic materials, that is for products that do not give rise to problems of degradation in the event of stagnation of the material inside the pump, are known to the art. Said types of pumps are volumetric pumps that provide control of flow speed and pressure, so as to ensure a constant product output volume.

Said known pumps generally comprise a pump body consisting of a single body, substantially parallelepiped, having an inlet duct for entry of the material and an outlet duct for discharge of the material. The inlet and outlet ducts communicate with a central seat or chamber to house a pair of gears for conveying the material from the inlet duct to the outlet duct of the pump.

The central gear seat is transversally open to the outside to allow insertion of the gears. Consequently, cylindrical supports or bearings which rotatably support the shafts of the gears are mounted in the pump body to support the gears.

Between each bearing and its seat formed in the pump body, sharp edges are formed wherein the material conveyed by the pump infiltrates. In said sharp edges, the material stagnates and undergoes combustion. As a result, the material that passes through the pump carries with it the dirt and burnt matter coming from the stagnating material.

Said drawback is accentuated by the fact that the pump gears are generally self-lubricated with the same material handled by the pump which passes through the gaps between the gear shafts and the bearings which support said shafts.

The foregoing proves a serious drawback, especially in the case of highly degradable materials, such as PVC. In fact in the finished product leaving the pump, a dark stripe can be noted due to contact with the stagnating material in the pump. Said dark stripe is unacceptable, for example, for transparent plastic materials. Furthermore, said dark stripe sets off a rapid degradation of all material in close contact therewith, with the result that, after a short time, the finished product becomes unusable.

For this reason degradable plastic materials such as PVC are extruded directly, without the use of pumps at the outlet from the extrusion screw and upstream of the extrusion head. All this to the detriment of quality and accuracy of tolerances of the finished product.

The object of the present invention is to overcome the drawbacks of the prior art, providing a pump for conveying molten masses of polymers and elastomers that is able to provide an end product of high quality that complies with narrow tolerances.

Another object of the present invention is to provide a pump for conveying molten masses of polymers and elastomers that is structurally simple, and thus cheap and easy to make.

Advantageous embodiments of the invention are apparent from the dependent claims. The pump for conveying molten masses of polymers and/or elastomers according to the invention comprises a pump body within which are formed an inlet duct for entry of the material, an outlet duct for discharge of the material and a central seat communicating with the inlet and outlet ducts and intended to house at least one gear mounted on a motorised shaft for conveying material from the inlet duct toward the outlet duct.

The main feature of the pump according to the invention is represented by the fact that the pump body consists of two parts that can be assembled together. Each part of the pump body comprises at least one through hole communicating with the central chamber. In this manner at least one gear shaft is rotatably supported directly inside the pair of opposite facing holes of the two parts of the pump body.

With this solution, use of bearings or cylindrical supports mounted in the pump body to rotatably support the gear shafts is avoided. Consequently, in the pump according to the invention sharp edges between the gear shaft supports and the pump body, in which material stagnates with consequent deterioration of the quality of the end product leaving the extrusion head and downstream of the pump, are avoided.

It is evident that the pump according to the invention can be used in particular for highly degradable polymers, such as PVC (Poly Vinyl Chloride), obtaining an end product that has good quality and narrow tolerance characteristics.

Further characteristics of the invention will be made clearer by the detailed description that follows, referring to a purely exemplary and therefore non-limiting embodiment thereof, illustrated in the enclosed drawings, in which.

Figure 1:
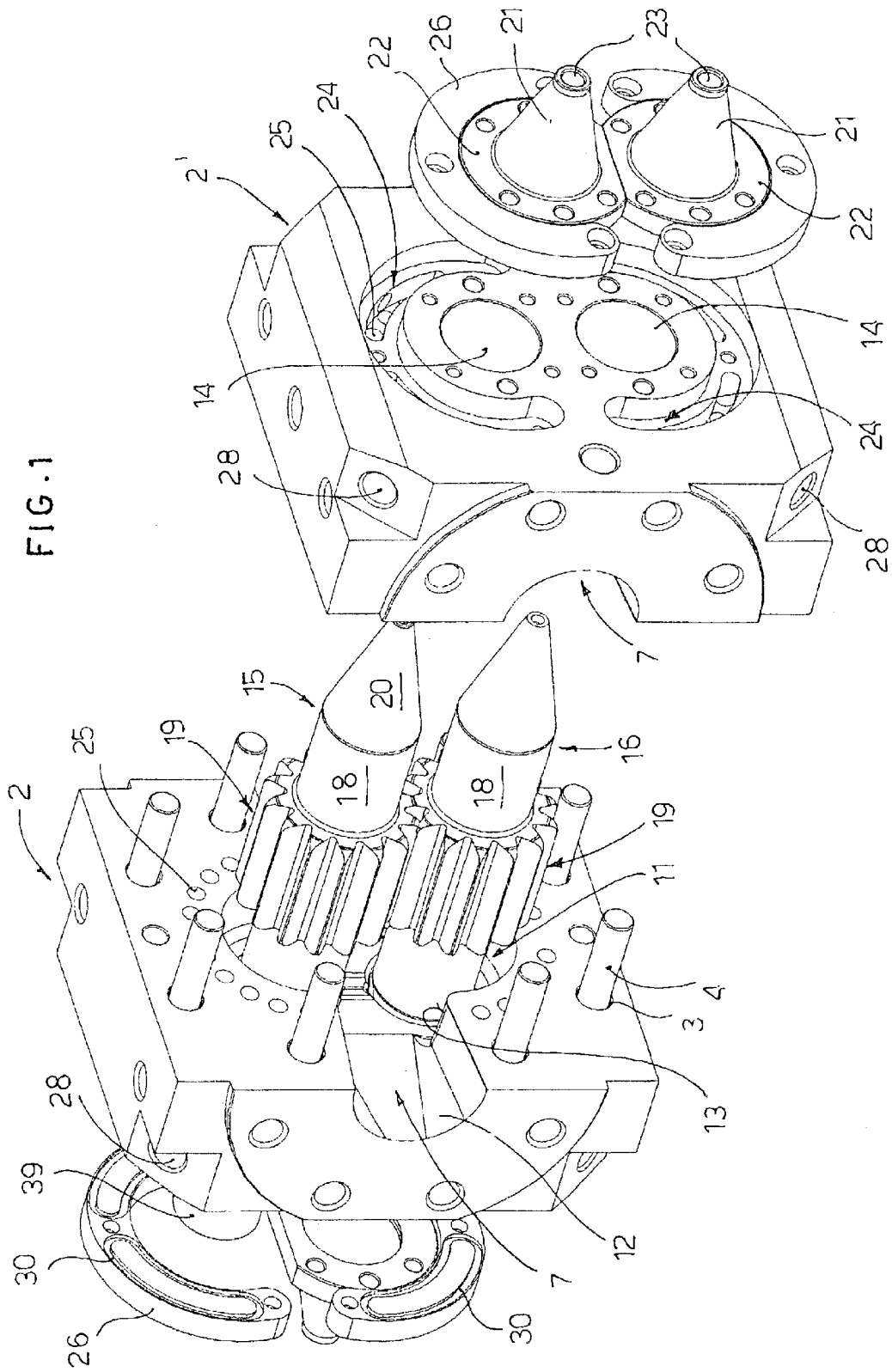
FIG. 1 is an exploded perspective view of a pump for conveying molten masses of polymers and elastomers according to the invention.

The pump according to the invention, designated as whole with reference numeral 1, is described with the aid of the figures.

The pump 1 comprises a substantially parallelepiped pump body consisting of two shell halves 2, 2', substantially identical and able to be assembled with each other. For greater clarity, the first shell half (that is, the one on the left side with reference to the figures) will be denoted hereunder by 2 and the second shell half (that is, the one on the right side with reference to the figures) will be denoted by 2'. Furthermore, the direction of entry/discharge of the material into/from of the pump 1 will be indicated with an axial direction.

The first shell half 2 has transverse through holes 3 peripherally to receive screw or nut means 4 that engage in threaded holes 5 provided in the shell half 2'. In this manner the two shell halves 2, 2' can be assembled together.

The two shell halves 2, 2' present axially an inlet aperture 7 and an outlet aperture 8, substantially semicylindrical. In this manner, when the two shell halves 2, 2' are coupled together, they define a cylindrical inlet duct 7 for entry of the material and a cylindrical outlet duct 8 for discharge of the material. The inlet and outlet apertures 7 and 8 have rounded inner profiles 12 to avoid the presence of sharp edges wherein the processed material could stagnate.

On the outer surface of each shell half, around the inlet aperture 7 and the outlet aperture 8 there is defined a semitoroidal flange 9 with holes 10 for fixing the pump 1. The two flanges 9 of the two shell halves 2, 2' assembled together form a toroidal flange around the respective inlet and outlet ducts 7, 8.

The inlet and outlet apertures 7, 8 of each shell half 2, 2' communicate with a central seat 11 having a substantially elliptical shape seen in axial section. Between the inlet and outlet openings 7 and 8 and the central seat 11 there are formed rounded connections 13 to avoid sharp edges in which material could stagnate.

In each central seat 11 of each shell half two through holes 14 are formed having a rounded peripheral connection 17 with the central seat 11 to avoid sharp edges in which material could stagnate. The transverse through holes 14 receive a pair of gears 15 and 16, wherein 15 is the driver gear connected to a motor unit and 16 is the driven gear.

Each gear 15, 16 comprises a substantially cylindrical shaft 18 whereon a toothing 19 in the form of a sprocket wheel or pinion is provided. The toothing 19 of the driver gear 15 and the driven gear 16 engage each other into the central seats 11 of the shell halves 2, 2'.

The shaft 18 of each gear 15, 16 is rotatably supported directly in the respective holes 14 of the shell halves 2, 2', without the need to provide further supports or bearings mounted in the pump body which give rise to sharp edges in which the material stagnates.

One end 39 of the shaft 18 of the driver gear 15 protrudes outward from the first shell half 2 to be connected to a drive shaft or to a transmission of a motor (not shown in the figures) which gives the driver gear 15 the rotatory motion around its own axis. As a result, the driver gear 15 sets the driven gear 16 in rotation and, through the toothing 19 of the gears, the molten plastic material entering the inlet duct 7 is distributed peripherally in the central seat 11 and leaves from the outlet duct 8 according to the speed of rotation of the gears 15 and 16.

For this purpose, the speed of rotation of the driver gear 15 determines a uniformity of the flow leaving the volumetric pump 1, irrespective of the feeding speed of the material inside the extruder upstream of the pump 1. In this manner a uniformity of the flow leaving the pump 1 is ensured, with the result of an end product having good characteristics of quality and tolerance.

Figure 5:
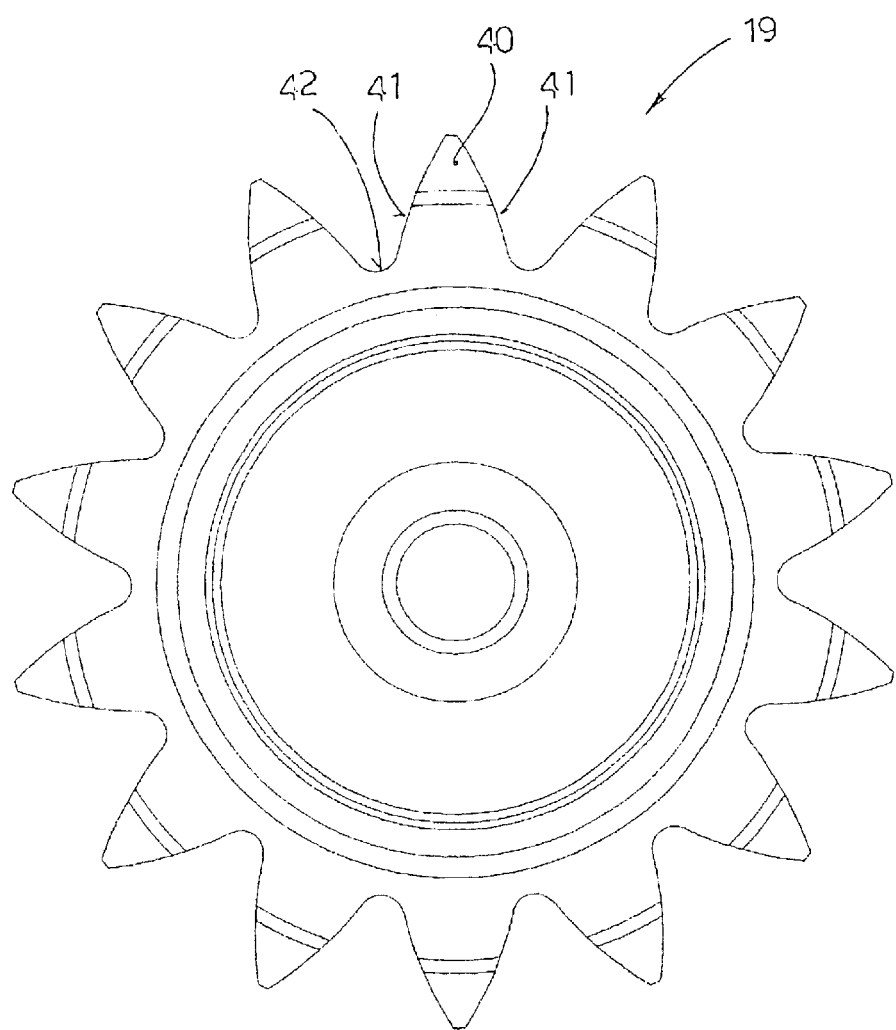
FIG. 5 is a cross sectional view of a gear of the pump according to the invention, illustrating the gear tooth profile.

As shown in FIG. 5, each gear 15, 16 has a special toothing 19 without sharp edges to ensure the smooth flow of the material and prevent it from stagnating between the edges of the toothing. Each tooth 40 of the toothing 19 has side profiles 41 substantially rounded on the flanks. Furthermore the root fillet 42 between one tooth 40 and the next is substantially rounded.

The other end of the shaft 18 of the driver gear 15 has a substantially conical or frusto conical shape 20 that protrudes outward from the second shell half 2' to engage, in a rotating conical coupling relationship, in a cap 21 having a conical or frusto conical cavity, complementary to the frusto conical end 20 of the shaft of the driver gear 15. The frusto conical cap 21 has a flange 22 with through holes to receive screw means for fixing to the shell half 2' around the hole 14.

The shaft 18 of the driven gear 16 has two ends 20 having a substantially frusto conical shape like the end of the driver gear 15. The ends 20 of the driven gear 16 protrude outward from the first and second shell half 2, 2', respectively, to engage in respective frusto conical caps 21 substantially the same as the cap of the driver gear 15.

Thus both the driver gear 15 and the driven gear 16, besides being rotatably supported in the holes 14 of respective shell halves 2,2', are centred, in a rotatable conical coupling relationship, in the respective frusto conical caps 21 disposed outside the pump body.

The gears 15 and 16 are self-lubricated by means of the plastic material that flows in the gaps left between the outer surface of the shafts 18 and the respective holes 14 of the shell halves 2 and 2' and in the gaps left between the outer surface of the conical ends 20 of the shafts 18 and the conical caps 21. For this purpose the end of the conical caps 21 has an outwardly open hole 23, through which the plastic material used for lubrication can exit. In this manner, the material used for self-lubrication can be recycled and re-used later, avoiding putting it immediately into the flow of material that passes though the inlet and outlet ducts 7, 8 of the pump 1.

The conical caps 21 can advantageously be adjusted in their axial movement so as to adjust the clearance of coupling with the conical end 20 of the gears, to adjust the flow of self-lubrication material to a minimum flow depending on the operating pressure. In the outer surface of each shell half 2, 2', peripherally with respect to the holes 14, a pair of semi-annular seats 24 are formed, substantially with an opposite facing U shape. Inside the U-shaped seats 24 there are formed a plurality of transverse through holes 25 which are arranged peripherally around the central seat 11, which receives the pinions 19 of the gears 15 and 16.

The holes 25 serve for the passage of a cooling and heat-regulating fluid to regulate the temperature of the material in the central seat 11 wherein the gear pinions 19 acts. The heat-regulating fluid can be, for example, water or oil, according to the process temperature at which the pump must work.

The heat-regulating seats 24 are tightly closed by means of substantially U-shaped closing covers 26 complementary to the seats 24. The closing covers 26 are applied from the outside of the pump body and are provided with special sealing means 30, such as gaskets.

Figure 2:
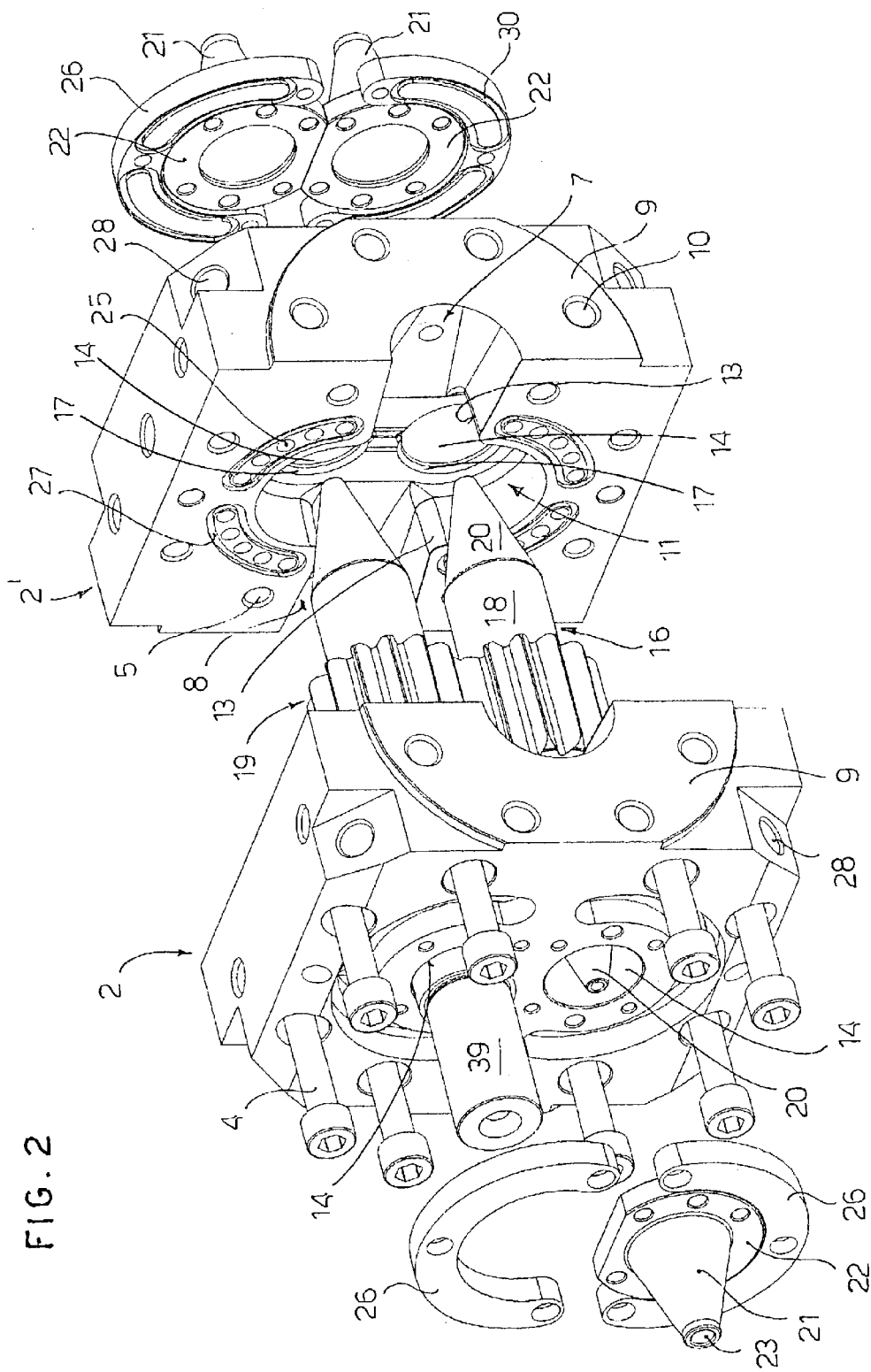
FIG. 2 is an exploded perspective view of the pump of FIG. 1, seen from another point of view.
Figure 3:
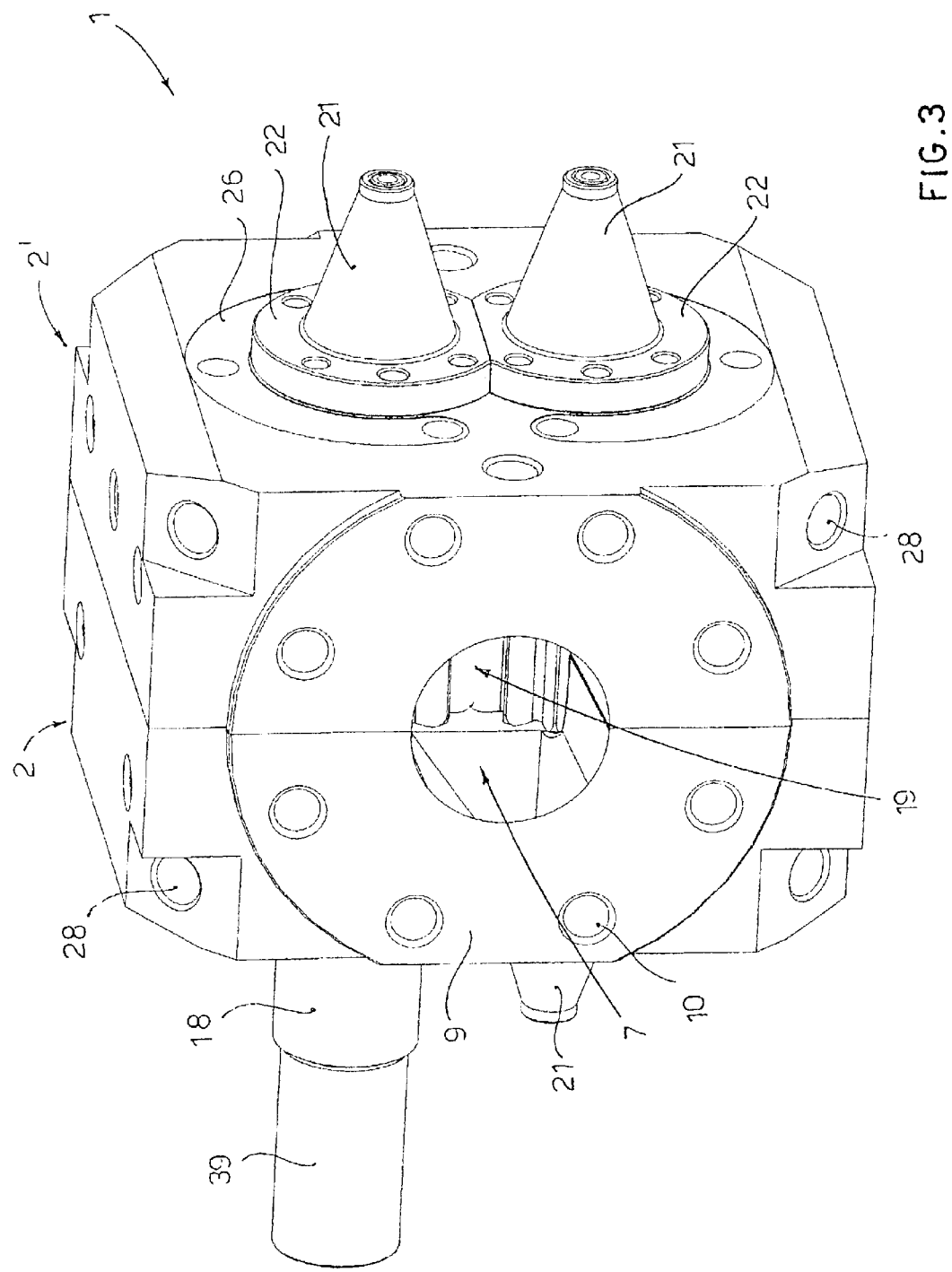
FIG. 3 is a perspective view of the pump of FIG. 1, assembled.
Figure 4:
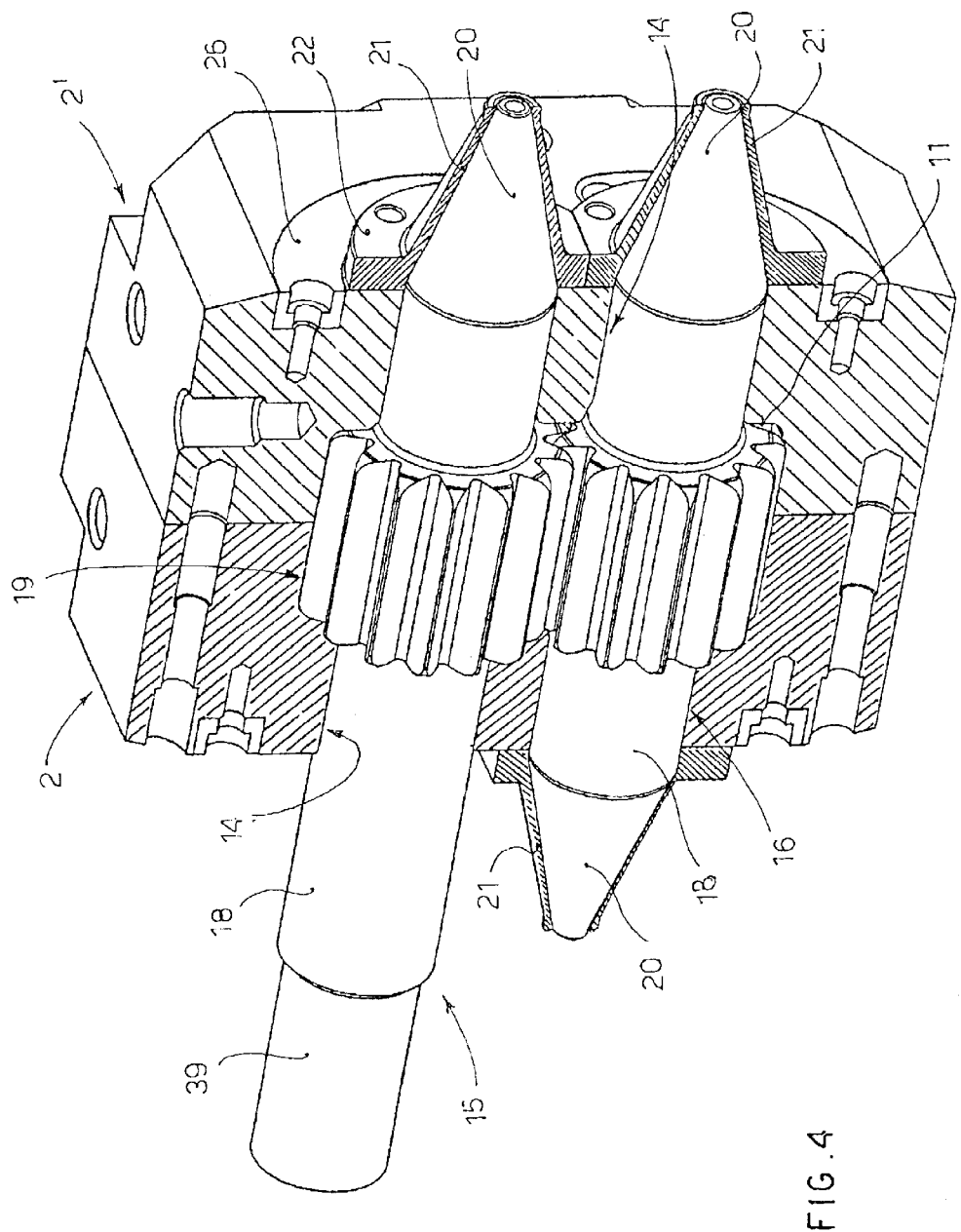
FIG. 4 is a perspective view of the pump of FIG. 3, sectioned along the sectional plane IV—IV of FIG. 3, in which the pump gears have not been sectioned.

As shown in FIG. 2, in the inner surface of the second shell half 2' around the heat regulating holes 25, there are disposed sealing gaskets 27 to ensure tightness on coupling of the two shell halves 2, 2'.

The heat regulating seats 24 communicate with the respective heat regulating ducts 28 formed in the outer edges of the shell halves 2, 2' which have advantageously been rounded off. In this manner there are eight inlet/outlet ducts 28 for the heat-regulating fluid, so as to have cross-flows according to heat-regulation requirements. In this manner perfect regulation of the process temperature can be ensured.

Obviously, as an alternative or in addition to said heat-regulation system, the shafts 18 of the gears can have an axial duct through which the cooling fluid flows.

In the present embodiment of the invention a pump body consisting of two substantially symmetrical shell halves 2, 2' has been illustrated. However, a pump body consisting of two different parts could also be provided, that is to say a main body in which are formed the inlet and outlet ducts 7 and 8 for the material, the central seat 11 of the gear toothing 19, which remains outwardly open, and the holes 14 for supporting the shafts 18 of the gears, and a cover, in which only the holes 14 for supporting the shafts of the gears are integrated, which covers only the central seat 11 of the gears.

Numerous changes and modifications of detail within the reach of a person skilled in the art can be made to the present embodiment of the invention, without thereby departing from the scope of the invention as set forth in the enclosed claims.

What is claimed is:

1. A pump for conveying molten masses of polymers and/or elastomers comprising a pump body in which are formed:

an inlet duct for entry of the material, an outlet duct for discharge of the material and an central seat communicating with said inlet and outlet ducts and intended to house at least one gear mounted on a motorized shaft, for conveying material from the inlet duct to the outlet duct, characterized in that said pump body consists of two parts that can be assembled together, each part of the pump body comprising at least one through hole communicating with said central seat, so that said at least one shaft of said gear is rotatably supported directly in said pair of opposite facing holes of said two parts of said pump body; and further characterized in that in said two parts of the pump body, around said central seat, seats are provided wherein a plurality of through holes are formed for the passage of a fluid for heat regulation of the pump.

2. A pump according to claim 1, characterized in that said heat-regulation seats are outwardly open and can be closed by means of tight closing covers.

3. A pump according to claim 1, characterized in that in the outside edges of said pump body parts ducts communicating with the heat-regulation seats for inlet/outlet of heat-regulating fluid are formed.

* * * * *